(12) United States Patent
Park et al.

(10) Patent No.: US 9,147,880 B2
(45) Date of Patent: Sep. 29, 2015

(54) ELECTRODE ACTIVE MATERIAL CONTAINING POLYDOPAMINE AND LITHIUM SECONDARY BATTERY INCLUDING THE SAME

(71) Applicant: LG CHEM, LTD., Seoul (KR)

(72) Inventors: Tae Jin Park, Daejeon (KR); Jae Hyun Lee, Daejeon (KR); SeongMin Lee, Seoul (KR); JangBae Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 136 days.

(21) Appl. No.: 13/865,707

(22) Filed: Apr. 18, 2013

(65) Prior Publication Data

US 2013/0302666 A1  Nov. 14, 2013

(30) Foreign Application Priority Data

Apr. 19, 2012  (KR) .................. 10-2012-0041158
Apr. 19, 2012  (KR) .................. 10-2012-0041163

(51) Int. Cl.

| H01M 4/60 | (2006.01) |
| H01M 4/36 | (2006.01) |
| H01M 4/525 | (2010.01) |
| H01M 4/505 | (2010.01) |
| H01M 4/131 | (2010.01) |
| H01M 4/485 | (2010.01) |
| H01M 4/62 | (2006.01) |
| H01M 10/0525 | (2010.01) |

(52) U.S. Cl.
CPC .............. *H01M 4/606* (2013.01); *H01M 4/131* (2013.01); *H01M 4/366* (2013.01); *H01M 4/485* (2013.01); *H01M 4/505* (2013.01); *H01M 4/525* (2013.01); *H01M 4/62* (2013.01); *H01M 10/0525* (2013.01); *Y02E 60/122* (2013.01)

(58) Field of Classification Search
CPC ..... H01M 4/366; H01M 4/505; H01M 4/525; H01M 4/606
USPC ........................................ 429/163
See application file for complete search history.

(56) References Cited

U.S. PATENT DOCUMENTS 5,580,681 A    12/1996  Fleischer
2013/0295440 A1*  11/2013  Lee et al. ............... 429/163

FOREIGN PATENT DOCUMENTS

KR    10-0226554    10/1999

* cited by examiner

*Primary Examiner* — Stewart Fraser
(74) *Attorney, Agent, or Firm* — Birch, Stewart, Kolasch & Birch, LLP

(57) ABSTRACT

Disclosed are an electrode active material including lithium metal oxide particles and a polydopamine layer formed on a surface of each of the lithium metal oxide particles, and a lithium secondary battery including the same.

16 Claims, 4 Drawing Sheets
(3 of 4 Drawing Sheet(s) Filed in Color)

9,147,880 B2

ELECTRODE ACTIVE MATERIAL CONTAINING POLYDOPAMINE AND LITHIUM SECONDARY BATTERY INCLUDING THE SAME

TECHNICAL FIELD

The present invention relates to a rechargeable lithium secondary battery and an electrode active material constituting the same.

BACKGROUND ART

As energy source prices are increasing due to depletion of fossil fuels and interest in environmental pollution is escalating, demand for environmentally-friendly alternative energy sources is bound to play an increasing role in future life. Thus, research into various power generation techniques such as nuclear energy, solar energy, wind energy, tidal power, and the like, continues to be underway, and power storage devices for more efficient use of the generated energy are also drawing much attention.

In particular, demand for lithium secondary batteries as energy sources is rapidly increasing as mobile device technology continues to develop and demand therefor continues to increase. Recently, use of lithium secondary batteries as a power source of electric vehicles (EVs) and hybrid electric vehicles (HEVs) has been realized and the market for lithium secondary batteries continues to expand to applications such as auxiliary power suppliers through smart-grid technology.

As cathode active materials for lithium secondary batteries, lithium cobalt-based oxides, lithium manganese-based oxides, lithium nickel-based oxides, lithium composite oxides, and the like are mainly used, and carbonaceous materials are mainly used as anode active materials. In addition, research into anode materials, prepared by alloying Li with silicon (Si) or tin (Sn), and lithium titanium oxides is underway.

$LiMn_2O_4$ having a spinel structure is an alternative to $LiCoO_2$, which is difficult to be used in high-voltage application in terms of energy density. However, $Mn^{3+}$ ions in the crystal lattice of the lithium manganese oxide react with an electrolyte at a voltage of 4 V or higher and thus impurities are formed on an electrode surface, and the crystal structure of the lithium manganese oxide is changed at room temperature due to Jahn-Teller distortion and thus reversible intercalation and deintercalation of lithium ions are difficult to implement, which results in dramatic reduction in capacity.

To address these problems, research into a method of substituting an $Mn^{3+}$ ion of $LiMn_2O_4$, which is situated at an octahedral 16d site, with one of the various transition metals (e.g., Cr, Ni, Fe, Cu, and Co), in order to improve properties of $LiMn_2O_4$, is underway. Among $Mn^{3+}$ ion-substituted lithium manganese oxides, $LiNi_{0.5}Mn_{1.5}O_4$ is known that $Mn^{3+}$ ions can theoretically be effectively inhibited by being substituted with $Ni^{2+}$ ions and thus enhanced electrochemical properties are anticipated.

However, $LiNi_{0.5}Mn_{1.5}O_4$ has an operating voltage of 4.5 V or higher, and thus, as an electrolyte including the same is oxidized, gas is discharged and by-products are generated, which results in deteriorated battery performance and increased resistance. Consequently, severe problems may occur in terms of battery safety.

Meanwhile, lithium titanium oxides have initial charge and discharge cycle efficiency that approximates to 100% and have a high operating voltage, thus, film formation on a surface of an anode due to electrolyte decomposition reaction does not occur. Accordingly, these lithium titanium oxides are expected to be used as a high-output anode material.

However, such lithium titanium oxide absorbs moisture in air. In addition, a diffusion rate of lithium ions of the lithium titanium oxide is low and thus lithium titanium oxide particles need to be prepared at nanoscale levels in order to decrease the migration distance of lithium ions. However, such nanoscale particles are susceptible to moisture.

Absorbed moisture is decomposed to generate a large amount of gas. Such gas is a cause of battery performance deterioration.

DISCLOSURE

Technical Problem

Therefore, the present invention has been made to solve the above problems and other technical problems that have yet to be resolved.

As a result of a variety of extensive and intensive studies and experiments, the inventors of the present invention found that, when an active material is surface-coated with polydopamine having low electronic conductivity, side reaction between a cathode active material and an electrolyte and generation of gas due to absorbed moisture may be reduced, whereby a battery including such active material may have enhanced rate characteristics, thus completing the present invention.

Technical Solution

In accordance with one aspect of the present invention, provided is an electrode active material including lithium metal oxide particles and a polydopamine layer formed on a surface of each lithium metal oxide particle.

The electrode active material according to the present invention may be prepared by immersing lithium metal oxide particles in a solution in which dopamine or a derivative thereof is dissolved, and stirring, washing, and drying the resulting solution.

The solution containing dopamine or a derivative thereof dissolved therein may have a pH of 7 to 10. When the pH of the solution is within the range described above, the dopamine or the derivative thereof may be self-polymerized.

Specifically, dopamine is used in a state of being dissolved in a distilled water-based buffer solution (e.g., 10 mM Tris buffer solution, pH 8.5), which is inexpensive and environmentally friendly, instead of commonly used organic solvents, which are expensive and environmentally harmful. Dopamine is used in this state because the solution with dopamine dissolved therein needs to be maintained in a weak base state (i.e., pH 8.5) to form a layer coated with polydopamine, which is a mussel-derived polymer, through self-polymerization of dopamine.

Polydopamine formed by the self-polymerization of dopamine may form a polydopamine layer on the surface of the lithium metal oxide particle.

The polydopamine layer may completely cover the surface of the lithium metal oxide particle. In some cases, the polydopamine layer may partially cover the surface of the lithium metal oxide particle.

The amount of the dopamine or the derivative thereof may be in the range of 0.5 wt % to 5 wt % based on a total weight of the electrode active material.

The polydopamine layer may have a thickness of 0.01 μm to 3 μm. The polydopamine layer may include polydopamine in an amount ranging from 0.5 wt % to 5 wt % based on the total weight of the electrode active material.

When the thickness of the polydopamine layer is less than 0.01 μm, side reaction between the polydopamine layer and an electrolyte and moisture absorption are not prevented. On the other hand, when the thickness of the polydopamine layer exceeds 3 μm, the polydopamine layer itself acts as a resistor and thus rate characteristics may be deteriorated.

Specifically, the polydopamine layer may contain moisture. Accordingly, in thermogravimetric analysis (TGA), a weight of the polydopamine layer may continuously decrease as temperate increases. This is assumed to be because chemisorbed moisture and dopamine are continuously decomposed during coating of dopamine.

That is, this may mean that adsorption of moisture on the lithium metal oxide particles is minimized or inhibited.

As can be confirmed by experimental example below, the present embodiment is different from a case in which the polydopamine layer is not formed on the surface of the lithium metal oxide particle in that such continuous action occurs.

The electrode active material may be a powder in which the lithium metal oxide particles, a surface of each of which is coated with the polydopamine layer, are aggregated.

The present invention also provides a lithium secondary battery in which an electrode assembly, which includes a cathode, an anode, and a polymer membrane disposed between the cathode and the anode, wherein the electrodes include the above-described electrode active material, is accommodated in a battery case and the battery case is sealed. The lithium secondary battery may include a lithium salt-containing non-aqueous electrolyte.

The lithium secondary battery may be a lithium ion battery, a lithium ion polymer battery, or a lithium polymer battery.

The electrodes may cathode or anode which can be fabricated using an electrode manufacturing method including the following processes.

The electrode manufacturing method includes: preparing a binder solution by dispersing or dissolving a binder in a solvent; preparing an electrode slurry by mixing the binder solution, an electrode active material, and a conductive material; coating the electrode slurry on a current collector; drying the electrode; and compressing the electrode to a uniform thickness.

In some cases, the electrode manufacturing method may further include drying a rolled electrode.

Preparation of the binder solution is a process of preparing a binder solution by dispersing or dissolving a binder in a solvent.

The binder may be any binder known in the art and, in particular, may be one or a mixture or copolymer of at least two selected from the group consisting of fluorine resin-based binders such as polyvinylidene fluoride (PVdF) and polytetrafluoroethylene (PTFE), rubber-based binders such as styrene-butadiene rubbers, acrylonitrile-butadiene rubbers, and styrene-isoprene rubbers, cellulose-based binders such as carboxymethyl cellulose (CMC), starch, hydroxypropylcellulose, and regenerated cellulose, polyalcohol-based binders, polyolefin-based binders such as polyethylene and polypropylene, polyimide-based binders, polyester-based binders, mussel adhesives, and silane-based binders.

The solvent may be optionally used according to the kind of the binder and may be, for example, an organic solvent such as isopropyl alcohol, N-methylpyrrolidone (NMP), acetone, or the like, or water.

The electrode active material and the conductive material may be mixed with or dispersed in the binder solution to prepare the electrode slurry. The electrode slurry may be transferred to a storage tank and stored until the electrode slurry is used in the coating process. To prevent the electrode slurry from hardening, the electrode slurry may be continuously stirred in the storage tank.

Examples of the electrode active material include, but are not limited to, layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+y}Mn_{2-y}O_4$ where $0 \leq y \leq 0.33$, $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides of Formula $LiNi_{1-y}M_yO_2$ where M=Co, Mn, Al, Cu, Fe, Mg, B, or Ga, and $0.01 \leq y \leq 0.3$; lithium manganese composite oxides of Formula $LiMn_{2-y}M_yO_2$ where M=Co, Ni, Fe, Cr, Zn, or Ta, and $0.01 \leq y \leq 0.1$, or Formula $Li_2Mn_3MO_8$ where M=Fe, Co, Ni, Cu, or Zn; $LiMn_2O_4$ in which some of the Li atoms are substituted with alkaline earth metal ions; disulfide compounds; $Fe_2(MoO_4)_3$; carbon such as hard carbon and graphite-based carbon; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb or Ge; Me': Al, B, P, Si, Group I, Group II and Group III elements, or halogens; $0 \leq x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; and Li—Co—Ni based materials.

In a non-restrictive embodiment, the electrode active material may include a lithium metal oxide, and the lithium metal oxide may be represented by Formula (1) below:

$$Li_aM'_bO_{4-c}A_c \qquad (1)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$, wherein a and b are determined according to oxidation number of M';

$0 \leq c \leq 0.2$, wherein c is determined according to oxidation number of A; and A is at least one monovalent or divalent anion.

The lithium metal oxide of Formula (1) may be represented by Formula (2) below:

$$Li_aTi_bO_4 \qquad (2)$$

wherein $0.5 \leq a \leq 3$ and $1 \leq b \leq 2.5$.

Examples of the lithium metal oxide include, but are not limited to, $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$.

In a non-restrictive embodiment, the lithium metal oxide may be $Li_{1.33}Ti_{1.67}O_4$ or $LiTi_2O_4$. In this regard, $Li_{1.33}Ti_{1.67}O_4$ has a spinel structure having a small change in crystal structure during charge/discharge and high reversibility.

The lithium metal oxide may be prepared using a manufacturing method known in the art, for example, solid-state reaction, a hydrothermal method, a sol-gel method, or the like. A detailed description of known manufacturing methods is omitted.

The lithium metal oxide may be in the form of a secondary particle in which primary particles are agglomerated with one another.

The secondary particle may have a diameter of 200 nm to 30 μm.

When the diameter of the secondary particle is less than 200 nm, reduction in adhesion is caused during an anode fabrication process. To address this problem, a larger amount of a binder needs to be used, which is not desirable in terms of energy density. On the other hand, when the diameter of the secondary particle exceeds 30 μm, a diffusion rate of lithium ions is low and thus it may be difficult to achieve high output.

In addition, in a non-restrictive embodiment, the electrode active material may include a spinel-structure lithium metal oxide represented by Formula (3) below:

$$Li_xM_yMn_{2-y}O_{4-z}A_z \qquad (3)$$

wherein 0.9≤x≤1.2, 0≤y≤2, and 0≤z≤0.2;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

A maximum substitution amount of A may be less than 0.2 mol % and, in particular, A may be at least one anion selected from the group consisting of halogens such as F, Cl, Br, and I, S, and N.

Due to substitution of the at least one anion, bonding strength between the anion and the transition metal is increased and structural transition of the oxide of Formula (3) is prevented, and thus, lifespan of the lithium secondary battery may be enhanced. On the other hand, when the substitution amount of A is too large (t≥0.2), lifespan characteristics of the lithium secondary battery may be rather deteriorated due to an unstable crystal structure of the oxide of Formula (3).

Specifically, the spinel-structure lithium metal oxide of Formula (3) may be a lithium metal oxide represented by Formula (4) below:

$$Li_xNi_yMn_{2-y}O_4 \qquad (4)$$

wherein 0.9≤x≤1.2 and 0.4≤y≤0.5.

More specifically, the lithium metal oxide may be $LiNi_{0.5}Mn_{1.5}O_4$ or $LiNi_{0.4}Mn_{1.6}O_4$.

The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may further optionally include a filler or the like, as desired.

The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry on a current collector is a process of coating the electrode slurry on a current collector in a predetermined pattern and to a uniform thickness by passing through a coater head.

The coating of the electrode slurry on a current collector may be performed by applying the electrode slurry to the current collector and uniformly dispersing the electrode slurry thereon using a doctor blade. The coating process may be performed by, for example, die casting, comma coating, screen printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A cathode current collector may have fine irregularities at a surface thereof to increase adhesion between a cathode active material and the cathode current collector and be used in any of various forms including films, sheets, foils, nets, porous structures, foams, and non-woven fabrics. Specifically, the cathode current collector may be a metal current collector, e.g., an Al current collector, and an anode current collector may be a metal current collector, e.g., a Cu current collector. The electrode current collector may be a metal foil, e.g., Al foil or Cu foil.

The drying process is a process of removing solvent and moisture from the electrode slurry to dry the electrode slurry coated on the current collector. In a specific embodiment, the drying process is performed in a vacuum oven at 50 to 200° C. for one day or less.

The electrode manufacturing method may further include a cooling process after the drying process. The cooling process may be performed by slow cooling to room temperature so that a recrystallized structure of the binder is satisfactorily formed.

To increase capacity density of the coating-completed electrode and increase adhesion between the current collector and the corresponding active material, the electrode may be compressed to a desired thickness by passing between two high-temperature heated rolls. This process is referred to as a rolling process.

Before passing between the two high-temperature heated rolls, the electrode may be subjected to a preheating process. The preheating process is a process to preheat the electrode before passing between the rolls in order to enhance compression of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be performed. The cooling process may be performed by slow cooling to room temperature such that a recrystallized structure of the binder is satisfactorily formed.

The polymer membrane is a separator that separates the cathode from the anode. When a solid electrolyte such as a polymer is used as the electrolyte, the solid electrolyte may also serve as both the separator and the electrolyte.

The separator may be an insulating thin film having high ion permeability and mechanical strength. The separator typically has a pore diameter of 0.01 to 10 μm and a thickness of 5 to 300 μm.

As the separator, sheets or non-woven fabrics made of an olefin-based polymer such as polypropylene, glass fibers, or polyethylene, which have chemical resistance and hydrophobicity, Kraft paper, or the like may be used. Applicable commercially available separators include Celgard type products (Celgard® 2400, 2300: Hoechest Celanese Corp.), polypropylene separators (Ube Industries Ltd., Pall RAI's products), polyethylene type separators (Tonen or Entek), and the like.

In some cases, the separator may be coated with a gel polymer electrolyte in order to increase stability of the lithium secondary battery. Examples of gel polymers include polyethylene oxide, polyvinylidene fluoride, and polyacrylonitrile.

Examples of the electrode assembly include a jelly-roll type electrode assembly (or a winding-type electrode assembly), a stack-type electrode assembly, and a stack/folding electrode assembly, which are known in the art.

As used herein, the stack/folding electrode assembly may be understood to include stack/folding electrode assemblies manufactured by arranging a unit cell having a structure in which a separator is disposed between a cathode and an anode on a separator sheet and folding or winding the separator sheet.

In addition, the electrode assembly may include an electrode assembly in which a structure having any one of a cathode and an anode disposed between separators is laminated in a stacked state by thermal bonding.

As the lithium salt-containing non-aqueous electrolyte, a non-aqueous electrolyte, an organic solid electrolyte, an inorganic solid electrolyte, or the like may be used.

For example, the non-aqueous electrolyte may be an aprotic organic solvent such as N-methyl-2-pyrrolidone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydroxy franc, 2-methyl tetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The lithium salt is a material that is readily soluble in the non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imide.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include a halogen-containing solvent such as carbon tetrachloride and ethylene trifluoride. In addition, in order to improve high-temperature storage characteristics, the electrolyte may further include carbon dioxide gas, fluoro-ethylene carbonate (FEC), propene sultone (PRS), fluoro-propylene carbonate (FPC), or the like.

In the lithium secondary battery according to the present invention, a ratio of discharge capacity at 6 C to discharge capacity at 0.1 C may be 0.80 or higher, and a ratio of discharge capacity at 10 C to discharge capacity at 0.1 C may be 0.58 or higher.

As can be confirmed by Experimental Examples 1, 2 and 3 below, the embodiments of the present invention are different from a case in which the polydopamine layer is not formed on the lithium metal oxide particles, in terms of the above-described numerical ranges.

The lithium secondary battery according to the present invention may be used in battery cells used as a power source of small devices and may also be suitable for use as a unit cell in medium and large battery modules including a plurality of battery cells.

The present invention also provides a battery pack including the battery module as a power source of medium and large devices. Examples of medium and large devices include, but are not limited to, electric vehicles (EVs), hybrid electric vehicles (HEVs), plug-in hybrid electric vehicles (PHEVs), and apparatuses for storing power.

Structures and manufacturing methods of the battery module and the battery pack are known in the art, and thus, a detailed description thereof is omitted.

Effects of Invention

As apparent from the fore-going, an electrode active material according to the present invention has a structure in which a polydopamine layer having low electronic conductivity is formed on a surface of a lithium metal oxide particle and thus may minimize side reaction between the electrode active material and an electrolyte at high voltage, i.e., 4.5 V or higher, and generation of a large amount of gas due to moisture adsorption.

A lithium secondary battery according to the present invention may exhibit enhanced rate characteristics as compared to a battery including a lithium metal oxide on which a polydopamine layer is not formed, as an active material.

Specifically, in the lithium secondary battery, a ratio of discharge capacity at 6 C to discharge capacity at 0.1 C may be 0.80 or higher, and a ratio of discharge capacity at 10 C to discharge capacity at 0.1 C may be 0.58 or higher.

BRIEF DESCRIPTION OF THE DRAWINGS

The patent or application file contains at least one color drawing. Copies of this patent or patent application publication with color drawing will be provided by the USPTO upon request and payment of the necessary fee.

The above and other objects, features and other advantages of the present invention will be more clearly understood from the following detailed description taken in conjunction with the accompanying drawings, in which.

BEST MODE

Now, the present invention will be described in more detail with reference to the following examples. These examples are provided only for illustration of the present invention and should not be construed as limiting the scope and spirit of the present invention.

Example 1

2 wt % of dopamine and 98 wt % of $Li_{1.33}Ti_{1.67}O_4$ powder were added to a buffer solution (pH 8.5) containing Tris-HCl and $H_2O$ in a volume ratio of 3:1, and the resulting solution was stirred for 2 hours and then washed with distilled water. The washed solution was dried at 130□ for 5 days to prepare an electrode active material surface-modified with polydopamine.

Solid containing the electrode active material, Super-P, and PVdF in a weight ratio of 82:5:13 was added to NMP and mixed to prepare an electrode slurry. The electrode slurry was coated on Al foil having a thickness of 20 μm to manufacture an electrode having a loading amount of 1.05 mAh/cm².

Lithium metal was used as a counter electrode and a carbonate electrode containing 1M $LiPF_6$ in a mixed solvent of EC:DMC:EMC (volume ratio of 3:4:3), thereby completing manufacture of a coin cell.

Example 2

A coin cell was manufactured in the same manner as in Example 1, except that $LiNi_{0.5}Mn_{1.5}O_4$ powder was used instead of the $Li_{1.33}Ti_{1.67}O_4$ powder.

Comparative Example 1

A coin cell was manufactured in the same manner as in Example 1, except that Bare-$Li_{1.33}Ti_{1.67}O_4$ powder that was not surface-modified with polydopamine was used.

Comparative Example 2

A coin cell was manufactured in the same manner as in Example 2, except that Bare-$LiNi_{0.5}Mn_{1.5}O_4$ powder that was not surface-modified with polydopamine was used.

Experimental Example 1

Figure 1:
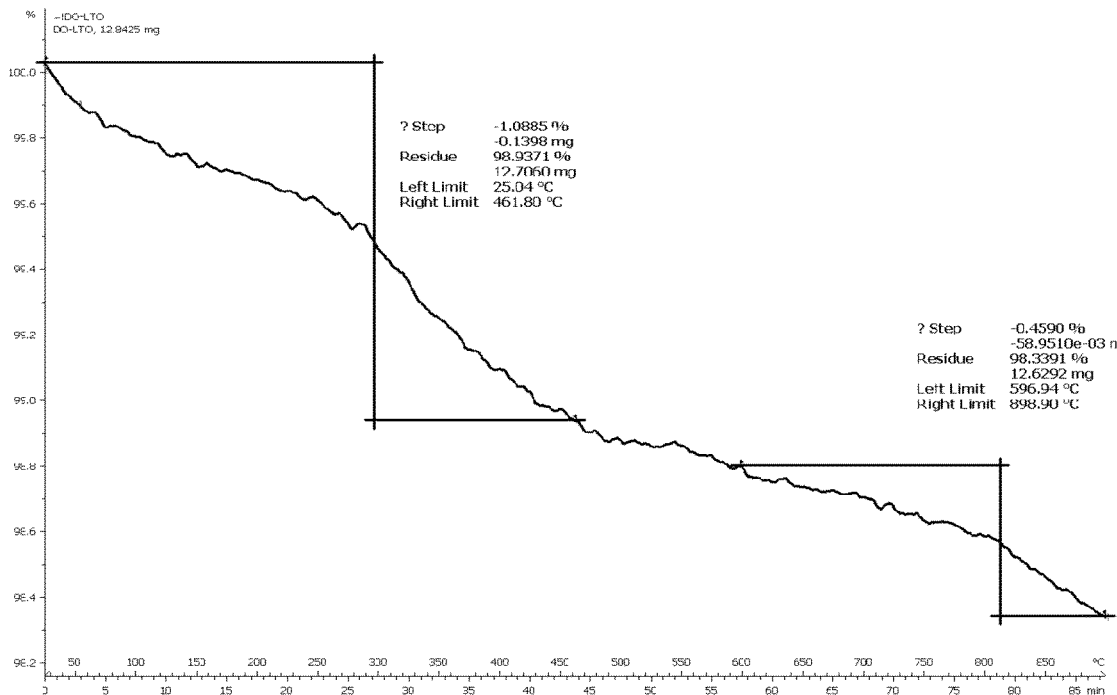
FIG. 1 is a thermogravimetric (TG) graph of non-restrictive Examples 1 and 2.
Figure 2:
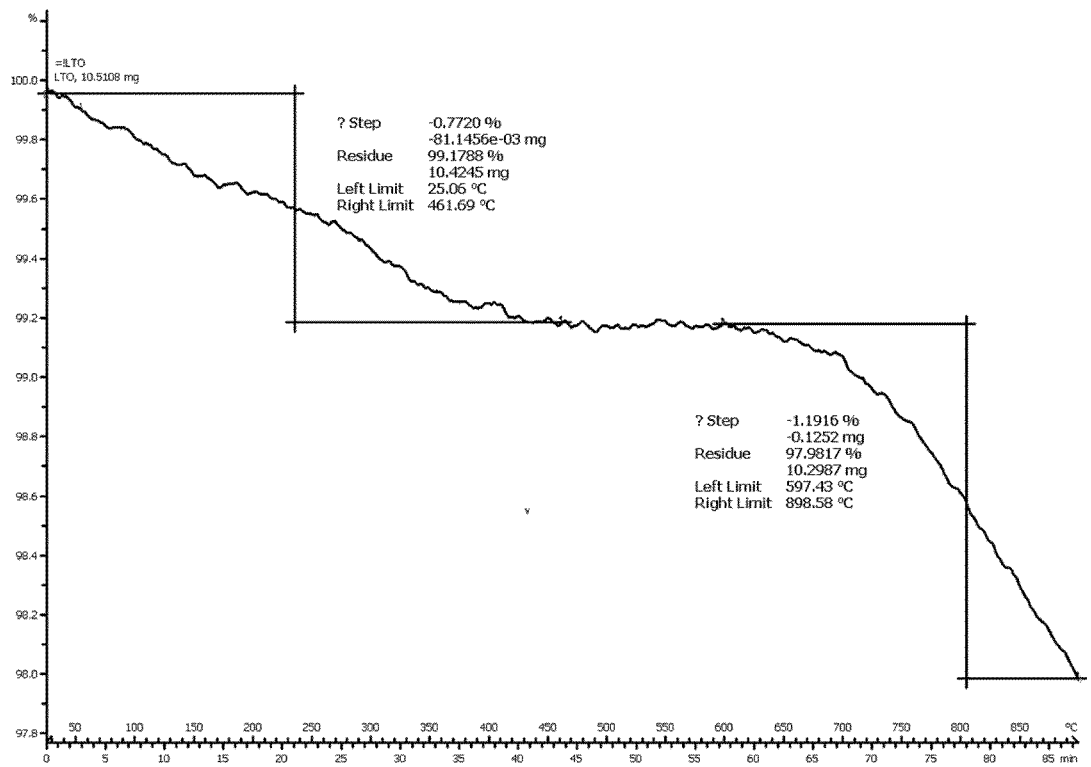
FIG. 2 is a TG graph of Comparative Examples 1 and 2.
Figure 3:
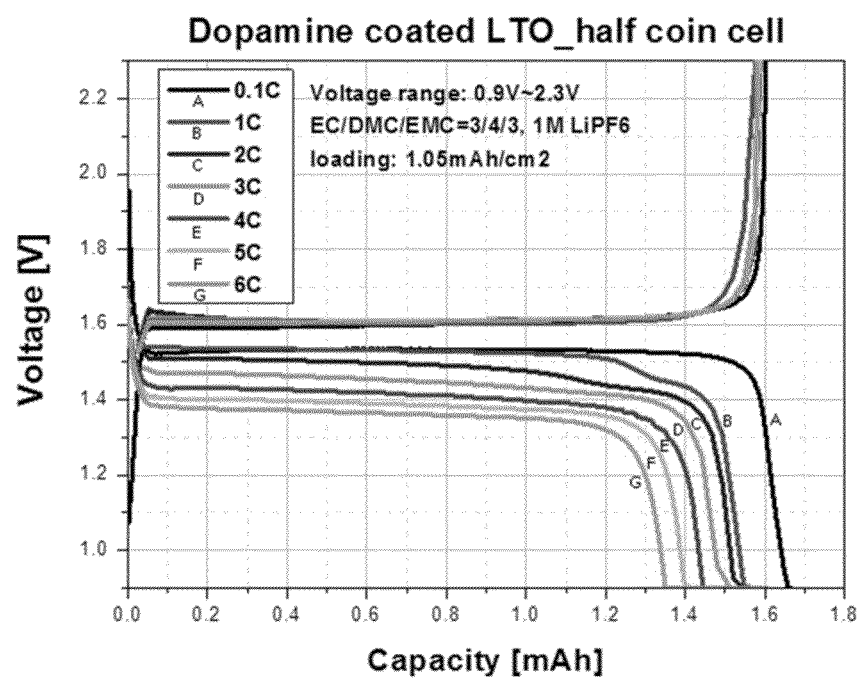
FIG. 3 is a charge/discharge graph of non-restrictive Examples 1 and 2.
Figure 4:
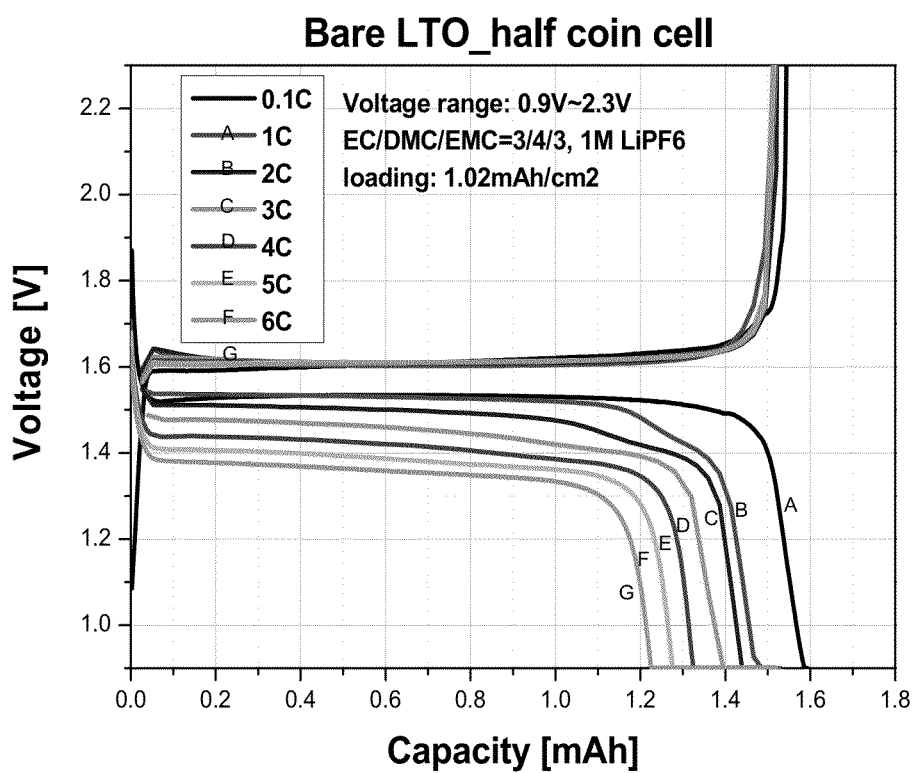
FIG. 4 is a charge/discharge graph of Comparative Examples 1 and 2.
Figure 5:
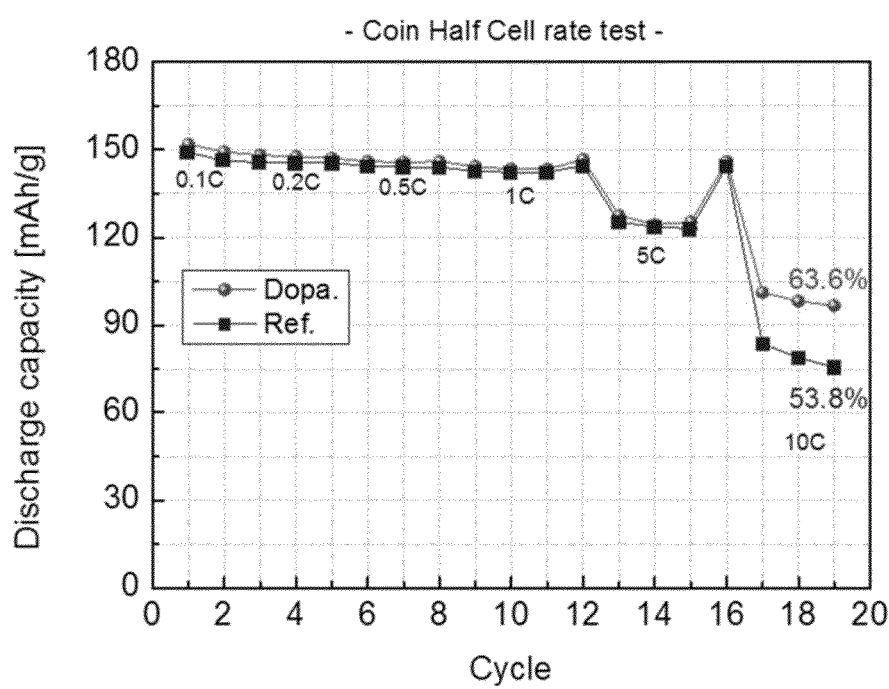
FIG. 5 is a charge/discharge graph of non-restrictive Examples 1 and 2 and Comparative Examples 1 and 2.

TGA was performed using 12.8425 mg of the electrode active material used in Example 1 and 10.5108 mg of the electrode active material used in Comparative Example 1. Referring to FIGS. 1 and 2, the TG graph of Example 1 shows a continuously decreasing weight, while the TG graph of Comparative Example 2 shows that weight reduction is non-continuous. This is assumed to be because chemisorbed moisture and dopamine are continuously decomposed during a dopamine coating process.

Experimental Example 2

The coin cells of Example 1 and Comparative Example 1 were charged at 0.1 C and 0.9 V to 2.3 V, and then each was discharged at 0.1 C, 1 C, 2 C, 3 C, 4 C, 5 C, and 6 C. A ratio of each of the discharge capacities at 0.1 C, 1 C, 2 C, 3 C, 4 C, 5 C, and 6 C to discharge capacity at 0.1 C is shown in Table 1 below. Referring to Table 1, it can be confirmed that the coin cell of Example 1 exhibited enhanced rate characteristics as compared to the coin cell of Comparative Example 1.

TABLE 1

|  | Example 1 | | Comparative Example 1 | |
| --- | --- | --- | --- | --- |
|  | Discharge capacity (mAh) | Efficiency vs. 0.1 C (%) | Discharge capacity (mAh) | Efficiency vs. 0.1 C (%) |
| 0.1 C | 1.66 | — | 1.58 | — |
| 1 C | 1.55 | 93.4 | 1.47 | 92.6 |
| 2 C | 1.52 | 91.8 | 1.41 | 89.2 |
| 3 C | 1.48 | 89.4 | 1.36 | 85.9 |
| 4 C | 1.44 | 87.0 | 1.32 | 83.5 |
| 5 C | 1.40 | 84.3 | 1.27 | 80.5 |
| 6 C | 1.35 | 81.4 | 1.22 | 77.3 |

Experimental Example 3

The coin cells of Example 2 and Comparative Example 2 were charged at 0.1 C and 3.0 V to 5.0 V, and then each was discharged at 0.1 C, 0.2 C, 0.5 C, 1 C, 5 C, and 10 C. A ratio of discharge capacity at 10 C to discharge capacity at 0.1 C is shown in Table 2 below. Referring to Table 2, it can be confirmed that the coin cell of Example 2 exhibited enhanced rate characteristics as compared to the coin cell of Comparative Example 2.

TABLE 2

|  | Example 2 | | Comparative Example 2 | |
| --- | --- | --- | --- | --- |
|  | Discharge capacity (mAh) | Efficiency vs. 0.1 C (%) | Discharge capacity (mAh) | Efficiency vs. 0.1 C (%) |
| 0.1 C | 149.28 | — | 146.25 | — |
| 10 C | 96.60 | 64.7 | 75.55 | 51.6 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An electrode active material comprising: particles of a lithium metal oxide; and a polydopamine layer formed on a surface of each of the particles.

2. The electrode active material according to claim 1, wherein the polydopamine layer contains moisture.

3. The electrode active material according to claim 2, wherein a weight of the electrode active material continuously decreases as temperature increases, in thermogravimetric analysis (TGA).

4. The electrode active material according to claim 1, wherein an amount of polydopamine is in a range of 0.5 wt % to 5 wt % based on a total weight of the electrode active material.

5. The electrode active material according to claim 1, wherein the lithium metal oxide is represented by Formula (1) below:

$$Li_aM'_bO_{4-c}A_c \quad (1)$$

wherein M' is at least one element selected from the group consisting of Ti, Sn, Cu, Pb, Sb, Zn, Fe, In, Al, and Zr;

0.1≤a≤4 and 0.2≤b≤4, wherein a and b are determined according to an oxidation number of M';

0≤c≤0.2, wherein c is determined according to an oxidation number of A; and

A is at least one monovalent or divalent anion.

6. The electrode active material according to claim 5, wherein the lithium metal oxide of Formula (1) is represented by Formula (2) below:

$$Li_aTi_bO_4 \quad (2)$$

wherein 0.5≤a≤3 and 1≤b≤2.5.

7. The electrode active material according to claim 6, wherein the lithium metal oxide is $Li_{1.33}Ti_{1.67}O_4$ or $LiTi_2O_4$.

8. The electrode active material according to claim 1, wherein the lithium metal oxide is a spinel-structure oxide represented by Formula (3) below:

$$Li_xM_yMn_{2-y}O_{4-z}A_z \quad (3)$$

wherein 0.9≤x≤1.2, 0<y<2, and 0≤z<0.2;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

9. The electrode active material according to claim 8, wherein the spinel structure oxide of Formula (3) is represented by Formula (4) below:

$$Li_xNi_yMn_{2-y}O_4 \quad (4)$$

wherein 0.9≤x≤1.2 and 0.4≤y≤0.5.

10. The electrode active material according to claim 9, wherein the lithium metal oxide is $LiNi_{0.5}Mn_{1.5}O_4$, or $LiNi_{0.4}Mn_{1.6}O_4$.

11. A lithium secondary battery comprising: an electrode assembly comprising a cathode, an anode, and a polymer membrane disposed between the cathode and the anode; and a battery case to accommodate the electrode assembly, wherein at least one of the cathode and the anode comprises the electrode active material according to according to claim 1.

12. The lithium secondary battery according to claim 11, wherein the lithium secondary battery is a lithium ion battery.

13. The lithium secondary battery according to claim 11, wherein the lithium secondary battery is a lithium polymer battery.

14. The lithium secondary battery according to claim 11, wherein the lithium secondary battery is a lithium ion polymer battery.

15. The lithium secondary battery according to claim 11, wherein a ratio of discharge capacity at 6 C to discharge capacity at 0.1 C is 0.80 or higher.

16. The lithium secondary battery according to claim 11, wherein a ratio of discharge capacity at 10 C to discharge capacity at 0.1 C is 0.58 or higher.

* * * * *